United States Patent
Li

(10) Patent No.: US 12,317,104 B2
(45) Date of Patent: May 27, 2025

(54) METHOD AND DEVICE FOR ALLOCATING BEAM FAILURE REQUEST RESOURCES

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 343 days.

(21) Appl. No.: 17/773,830

(22) PCT Filed: Nov. 5, 2019

(86) PCT No.: PCT/CN2019/115830
§ 371 (c)(1),
(2) Date: May 2, 2022

(87) PCT Pub. No.: WO2021/087786
PCT Pub. Date: May 14, 2021

(65) Prior Publication Data
US 2022/0369131 A1 Nov. 17, 2022

(51) Int. Cl.
*H04W 24/04* (2009.01)
*H04W 72/044* (2023.01)

(52) U.S. Cl.
CPC ......... *H04W 24/04* (2013.01); *H04W 72/046* (2013.01)

(58) Field of Classification Search
CPC ... H04W 24/04; H04W 72/046; H04W 72/20; H04W 72/543; H04W 72/21;
(Continued)

(56) References Cited

U.S. PATENT DOCUMENTS

2019/0053288 A1\* 2/2019 Zhou ................. H04W 76/27
2019/0190582 A1 6/2019 Guo et al.
(Continued)

FOREIGN PATENT DOCUMENTS

CN 110149177 A 8/2019
CN 110324908 A 10/2019
(Continued)

OTHER PUBLICATIONS

European Patent Application No. 19951570.1, Search and Opinion dated Aug. 7, 2023, 12 pages.
(Continued)

*Primary Examiner* — Kodzovi Acolatse
*Assistant Examiner* — Anindita Sen
(74) *Attorney, Agent, or Firm* — Cozen O'Connor

(57) ABSTRACT

A method and device for allocating beam failure request resources. The method is performed by a terminal configured with multiple beam failure request resources. The multiple beam failure request resources consist of physical uplink control channel beam failure request resources configured for service cells in multiple service cell groups configured for the terminal. The method includes: detecting whether there is a first secondary cell in which a beam failure has occurred; and if so, selecting from the multiple beam failure request resources, according to whether the first secondary cell is configured with a beam failure request resource, one beam failure request resource as a resource for sending a beam failure request.

11 Claims, 3 Drawing Sheets

(58) Field of Classification Search
CPC ... H04B 7/0695; H04L 5/0053; H04L 5/0023; H04L 5/001
See application file for complete search history.

(56) References Cited

U.S. PATENT DOCUMENTS

| | | | | |
|---|---|---|---|---|
| 2019/0274098 | A1* | 9/2019 | Cheng | H04L 5/0025 |
| 2020/0145280 | A1* | 5/2020 | Cirik | H04L 41/0668 |
| 2021/0058285 | A1* | 2/2021 | Wu | H04B 7/088 |
| 2021/0159967 | A1* | 5/2021 | Cirik | H04W 76/38 |
| 2022/0070853 | A1* | 3/2022 | Guo | H04B 7/0695 |
| 2024/0113763 | A1* | 4/2024 | Yang | H04W 80/02 |

FOREIGN PATENT DOCUMENTS

| | | |
|---|---|---|
| EP | 3525516 A | 8/2019 |
| WO | WO 2019184716 A1 | 10/2019 |
| WO | WO 2019191960 A1 | 10/2019 |

OTHER PUBLICATIONS

Russian Patent Application No. 2022115124, Office Action dated Sep. 2, 2022; 6 pages.
Russian Patent Application No. 2022115124, English translation of Office Action dated Sep. 2, 2022; 5 pages.
Japanese Patent Application No. 2022-525548, Office Action dated Mar. 7, 2023; 3 pages.
Japanese Patent Application No. 2022-525548, English translation of Office Action dated Mar. 7, 2023, 3 pages.
NTT Docomo, Inc. "Discussion on multi-beam enhancement" 3GPP TSG RAN WG1 #96bis, R1-1904967, Apr. 2019, 27 pages.
Vivo "Discussion on remaining issues on multi beam enhancement" 3GPP TSG RAN WG1 #98bis, R1-1910230, Oct. 2019, 10 pages.
Xiaomi "Enhancements on beam management" 3GPP TSG RAN WG1 #98bis, R1-1911216, Oct. 2019, 4 pages.
Media Tek Inc. "Enhancements on multi-beam operations" 3GPP TSG RAN WG1 #98bis, R1-1911047, Oct. 2019, 11 pages.
Korean Patent Application 10-2022-7018802 Office Action dated Mar. 26, 2024, 6 pages.
Korean Patent Application 10-2022-7018802 English translation of Office Action dated Mar. 26, 2024, 6 pages.
Apple Inc., "Feature Lead Summary on SCell BFR and L1-SINR", 3GPP TSG-RAN WG1 Meeting #98bis, R1-1911506, Oct. 2019, 24 pages.
Qualcomm Incorporated, "Enhancements on Multi-beam Operation", 3GPP TSG-RAN WGI Meeting #98, RI-1911127, Oct. 2019, 22 pages.
Apple, "SCell BFR Operation", 3GPP TSG-RAN WG2 Meeting #107bis, R2-1912470, Oct. 2019, 4 pages.
PCT/CN2019/115830 English translation of International Search Report dated Jul. 24, 2020, 2 pages.

* cited by examiner

METHOD AND DEVICE FOR ALLOCATING BEAM FAILURE REQUEST RESOURCES

CROSS-REFERENCE TO RELATED APPLICATION

This application is the US national phase application of International Application No. PCT/CN2019/115830, filed on Nov. 5, 2019, the entire contents of which are incorporated herein by reference.

TECHNICAL FIELD

The disclosure relates to the technical field of wireless communication, and in particular to a method and an apparatus for allocating beam failure request resources, and a storage medium.

BACKGROUND

In a New Radio (NR) communication system, in order to ensure coverage and resist path loss, it is usually necessary to transmit and receive data based on beams. In NR, since the control channel also needs to use beam-based transmission and reception, when the terminal moves or the direction of the antenna rotates, the beam currently configured for the terminal for transmission and reception may have problems, that is, the problem of beam failure appears.

In the related art, when the terminal detects that a beam failure occurs in the secondary cell (SCell), the network device needs to configure a physical uplink control channel-beam failure request (PUCCH-BFR) resource for the terminal to send BFR to the network device, indicating that beam failure has occurred. At present, for the terminal, the network device (such as a base station) may configure multiple PUCCH-BFR resources on its different serving cells. How to select a PUCCH-BFR resource for sending BFR among multiple PUCCH-BFR resources is a problem that needs to be resolved.

SUMMARY

According to a first aspect of the disclosure, a method for allocating beam failure request resources is provided. The method is performed by a terminal, wherein the terminal is configured with a plurality of beam failure request resources, and the plurality of beam failure request resources consist of physical uplink control channel beam failure request resources configured for serving cells in a plurality of service cell groups configured for the terminal. The method for allocating beam failure request resources includes:

detecting whether there is a first secondary cell with beam failure; in response to detecting the first secondary cell with beam failure, selecting one beam failure request resource from the plurality of beam failure request resources as a resource for sending a beam failure request, according to whether the first secondary cell is configured with a beam failure request resource.

According to a second aspect of the disclosure, a terminal is provided. The terminal is configured with a plurality of beam failure request resources, and the plurality of beam failure request resources consist of physical uplink control channel beam failure request resources configured for serving cells in a plurality of service cell groups configured for the terminal. The terminal includes a processor and a memory configured to store instructions executable by the processor. The processor is configured to implement the method described in the first aspect by executing the instructions stored in the memory.

According to a third aspect of the disclosure, a non-transitory computer readable storage medium is provided. When instructions in the storage medium is executed by a processor of a mobile terminal, the mobile terminal is enabled to implement the method for allocating beam failure request resources in the first aspect.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
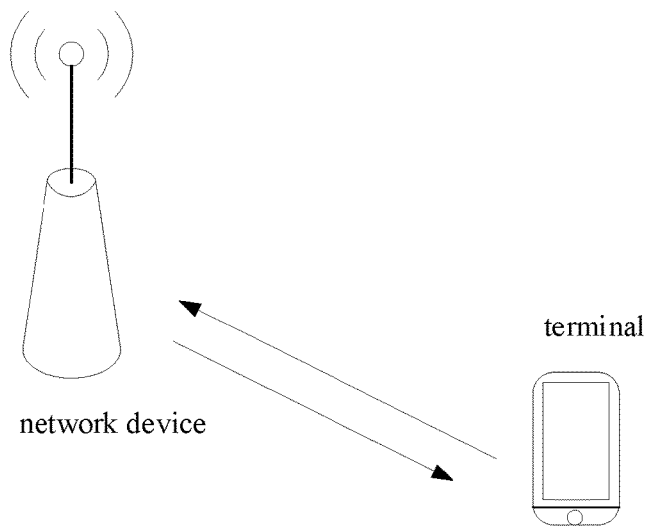
FIG. 1 is a schematic diagram of a wireless communication system according to an exemplary embodiment.

The method for allocating beam failure request resources provided by embodiments of the present disclosure can be applied to a wireless communication system shown in FIG. 1. Referring to FIG. 1, the wireless communication system includes a network device and a terminal. The terminal is connected to the network device through wireless resources, and performs data transmission.

It can be understood that the wireless communication system shown in FIG. 1 is only a schematic illustration, and the wireless communication system may also include other network devices, such as core network devices, wireless relay devices, and wireless backhaul devices, which are not shown in FIG. 1. Embodiments of the present disclosure do not limit the number of network devices and the number of terminals included in the wireless communication system.

It can be further understood that the wireless communication system according to embodiments of the present disclosure is a network providing a wireless communication function. Wireless communication systems can employ different communication technologies, such as code division multiple access (CDMA), wideband code division multiple access (WCDMA), time division multiple access (TDMA), frequency division multiple access (FDMA), orthogonal frequency division multiple access (OFDMA), single carrier FDMA (SC-FDMA), carrier sense multiple access with collision avoidance. According to the capacity, speed, delay and other factors of different networks, the networks can be divided into 2G (generation) network, 3G network, 4G network or future evolution network, such as 5G network. 5G network can also be called New Radio (NR). For convenience of description, the wireless communication network is called a network for short sometimes in the present disclosure.

Further, the network devices involved in the present disclosure may also be referred to as wireless access network devices. The wireless access network devices may be: a base station, an evolved node B, a home base station, an access point (AP) in a wireless fidelity (WIFI) system, a wireless relay node, a wireless backhaul node, a transmission point (TP) or a transmission and reception point (TRP), etc., and may also be a gNB in an NR system, or may also be a component or part of a device that constitutes a base station. It should be understood that, in embodiments of the present disclosure, the specific technology and specific device form adopted by the network device are not limited. In the present disclosure, the network device may provide communication coverage for a specific geographic area, and may communicate with terminals located within the coverage area (cell). In addition, when it is a vehicle-to-everything (V2X) communication system, the network device may also be a vehicle-mounted device.

Further, the terminal involved in the present disclosure may also be referred to as terminal device, user equipment (UE), mobile station (MS), mobile terminal (MT), etc, which is a device that provides voice and/or data connectivity to users. For example, the terminal may be a handheld device with wireless connectivity, a vehicle-mounted device, or the like. At present, some examples of terminals are: Smart Phone, Pocket Personal Computer (PPC), PDA, Personal Digital Assistant (PDA), notebook computer, tablet computer, wearable device, or vehicle-mounted device, etc. In addition, when it is the vehicle-to-everything (V2X) communication system, the terminal device may also be a vehicle-mounted device. It should be understood that the embodiments of the present disclosure do not limit the specific technology and specific device form adopted by the terminal.

In NR, especially when the communication frequency band is in frequency range 2, since the high-frequency channel attenuates rapidly, in order to ensure the coverage, beam-based transmission and reception need to be used between the terminal and the network device.

In NR, since the control channel also needs to use beam-based transmission and reception, when the terminal moves or the direction of the antenna rotates, the beam currently configured for the terminal for transmission and reception may have problems, that is, a problem of beam failure occurs. For example, a transmitting beam or a receiving beam that is currently configured by the network device to the terminal for transmitting and receiving a physical downlink control channel (PDCCH) may have a problem, that is, a problem of beam failure occurs. The current standard defines that for SCell, when the terminal detects beam failure on the SCell, the process of reporting beam failure is divided into two steps: in the first step, the terminal requests a physical uplink shared channel (PUSCH) resource from the network device based on a signaling similar to a physical uplink control channel-Scheduling Request (PUCCH-SR), that is, PUCCH-BFR; in the second step, the terminal sends the index of the SCell in which the beam failure occurs in the form of a medium access control (MAC) information element (CE) through the PUSCH resource allocated by the network device. When the terminal detects a new beam, the terminal sends the index of the new beam on the SCell detected by the terminal in the form of a MAC CE while sending the index of the SCell in which the beam failure occurs.

In the related art, when the beam failure occurs in a secondary cell (SCell), the terminal needs to be configured with a physical uplink control channel-beam failure request (PUCCH-BFR) resource to send BFR to the network device, indicating that the beam failure has occurred. At present, in addition to configuring PUCCH resources on the primary cell (PCell) or primary secondary cell (PSCell) for PUCCH-BFR, it is also possible to select an SCell from a serving cell belonging to a different PUCCH group from the PCell/PSCell, to configure a PUCCH resource for the terminal to be used for PUCCH-BFR. Therefore, for the terminal that may be configured with a plurality of PUCCH-BFR resources, how to select a PUCCH-BFR resource for sending BFR from the plurality of PUCCH-BFR resources is a problem that needs to be solved.

In view of this, embodiments of the present disclosure provide a method for allocating BFR resources, which is applied to a terminal. The terminal is configured with a plurality of BFR resources. The plurality of BFR resources are composed of PUCCH-BFR resources configured for serving cells in a plurality of serving cell groups configured for the terminal. In other words, the method for allocating BFR resources provided by embodiments of the present disclosure can also be understood as a method for allocating PUCCH-BFR resources. When PUCCH-BFR resource allocation is performed, it is detected whether there is an SCell in which beam failure occurs. When an SCell with beam failure is detected, according to whether the SCell is configured with a PUCCH-BFR resource, one PUCCH-BFR resource is selected from the plurality of PUCCH-BFR resources as a PUCCH-BFR resource for sending BFR.

Figure 2:
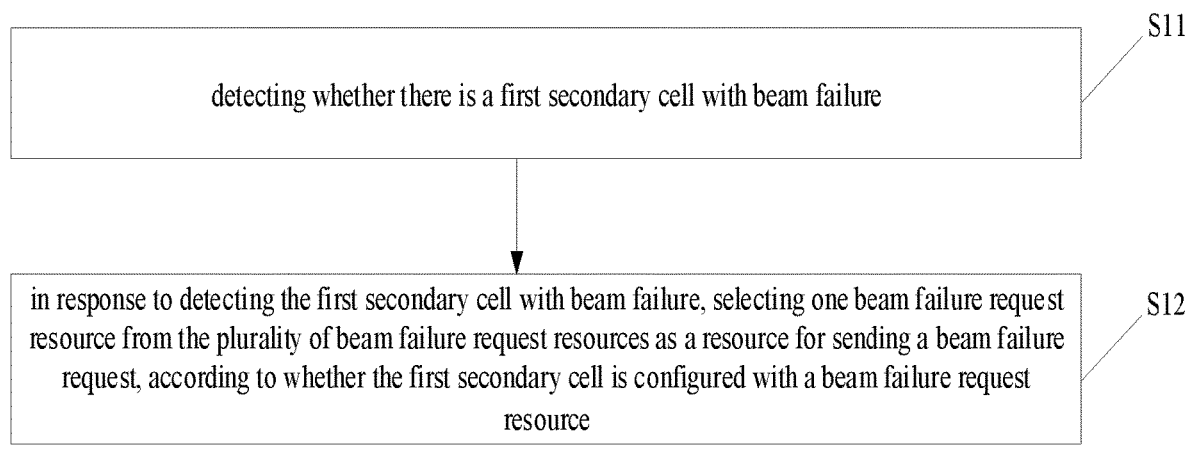
FIG. 2 is a flowchart of a method for allocating beam failure request resources according to an exemplary embodiment.

FIG. 2 is a flowchart showing a method for allocating PUCCH-BFR resources according to an exemplary embodiment. As shown in FIG. 2, the method for allocating PUCCH-BFR resources is applied in a terminal, and includes the following steps.

In step S11, it is detected whether there is a SCell with beam failure.

In embodiments of the present disclosure, for the convenience of description, the SCell with beam failure is referred to as a first SCell.

In embodiments of the present disclosure, when the first SCell with beam failure is detected, step S12 may be executed. When the first SCell with beam failure is not detected, the original communication process can be maintained.

In step S12, according to whether the first SCell is configured with a PUCCH-BFR resource, one PUCCH-BFR resource is selected from a plurality of PUCCH-BFR resources as a PUCCH-BFR resource for sending BFR.

For convenience of description in embodiments of the present disclosure, the SCell configured with the PUCCH-BFR resource is referred to as a second SCell.

In embodiments of the present disclosure, when a secondary cell in which a beam failure occurs is detected, one beam failure request resource is selected from a plurality of beam failure request resources according to whether the secondary cell is configured with a beam failure request resource, as a resource for sending a beam failure request, which realizes determining the resource for sending the beam failure request from the plurality of beam failure request resources.

In embodiments of the present disclosure, a process for allocating PUCCH-BFR resources involved in the above embodiments will be described below with reference to practical applications.

In embodiments of the present disclosure, the serving cell groups configured for the terminal are divided into two types, one is a serving cell group including PCell/PSCell, which is called a first serving cell group, and the other is a serving cell group that does not include PCell/PSCell but only includes SCell, which is called a second serving cell group. The first serving cell group includes SCells that are not configured with PUCCH-BFR resources and PCells/PSCells that are configured with PUCCH-BFR resources. The second serving cell group includes SCells that are configured with PUCCH-BFR resources and SCells that are not configured with PUCCH-BFR resources. For example, the terminal is configured with PCell/PSCell, SCell#1, SCell#2, SCell#3 and SCell#4, and these serving cells are divided into two PUCCH groups, in which PUCCH group1 includes PCell/PSCell, SCell#1, SCell#2, and PCell/PSCell is configured with PUCCH-BFR1; PUCCH group2 includes SCell#3 and SCell#4, and SCell#3 is configured with PUCCH-BFR2.

In embodiments of the present disclosure, firstly, the process of selecting the PUCCH-BFR resource when the first SCell in which beam failure occurs is not configured with the PUCCH-BFR resource is described.

In embodiments of the present disclosure, when the first SCell in which beam failure occurs is not configured with the PUCCH-BFR resource, that is, when the SCell in which beam failure occurs is not configured with PUCCH-BFR, the terminal has two kinds of optional PUCCH-BFR resources, one is PUCCH-BFR resources in the PUCCH group to which the SCell with beam failure belongs, and the other is PUCCH-BFR resources in another PUCCH group different from the PUCCH group to which the SCell with beam failure belongs.

In embodiments of the present disclosure, the terminal may select one PUCCH-BFR resource from a plurality of PUCCH-BFR resources in at least one of the following ways: selecting the PUCCH-BFR resource configured for the serving cell in the PUCCH group to which the first SCell belongs; selecting the PUCCH-BFR resource that appears first in time; selecting the PUCCH-BFR resource that does not need to transmit other uplink information; selecting the PUCCH-BFR resource that can be multiplexed with other uplink information.

In embodiments of the present disclosure, the following description takes the case where the terminal is configured with PCell/PSCell, SCell#1, SCell#2, SCell#3 and SCell#4, and these serving cells are divided into two PUCCH groups as an example. PUCCH group1 includes PCell/PSCell, SCell#1, SCell#2, and PCell/PSCell is configured with PUCCH-BFR1. PUCCH group2 includes SCell#3 and SCell#4, and SCell#3 is configured with PUCCH-BFR2. It is assumed that the SCell with beam failure detected by the terminal is an SCell that is not configured with a PUCCH-BFR resource, for example, SCell#1, or SCell#2, or SCell#4. The terminal may preferentially select the PUCCH-BFR resource configured for the serving cell in the PUCCH group to which the first SCell belongs. For example, when beam failure occurs in SCell#4, BFR is transmitted using PUCCH-BFR2. When beam failure occurs in SCell#1 or SCell#2, BFR is sent using PUCCH-BFR1.

In embodiments of the present disclosure, when the beam failure occurs and the PUCCH-BFR resource is not configured, the PUCCH-BFR resource configured for the serving cell in the PUCCH group to which the first SCell belongs is preferentially selected, that is, when the beam failure occurs in the SCell in the PUCCH group, and the SCell in which the beam failure occurs is not configured with PUCCH-BFR, the PUCCH-BFR in the PUCCH group is selected to transmit the BFR. Therefore, for the PUCCH group that does not include PCell/PSCell, the PUCCH-BFR resource on the SCell configured in the PUCCH group can be preferentially used, and the PUCCH-BFR resource configured on PCell/PSCell is only used when the beam failure occurs on the SCell configured with the PUCCH-BFR resource in the PUCCH group, thereby reducing the signaling overhead of MAC CE.

Further, since the PUCCH-BFR may appear periodically, in embodiments of the present disclosure, when the beam failure occurs and the PUCCH-BFR resource is not configured, the following priorities may also be used to select the PUCCH-BFR resource. For example, the PUCCH-BFR resource that appears first in time can be preferentially selected. For example, when the terminal detects an SCell with a beam failure, and the first available PUCCH-BFR resource is the PUCCH-BFR1 resource configured on the PUCCH group1, then the terminal preferentially uses the PUCCH-BFR1 resource. Further, in embodiments of the present disclosure, the PUCCH-BFR resource that does not need to transmit other uplink information (such as sounding reference signal (SRS), scheduling request (SR), hybrid automatic repeat request (HARQ), and channel state information reference signal (CSI-RS)) can be preferentially selected. It should be noted here that the PUCCH resource where the PUCCH-BFR resource is located does not need to be used to send other uplink information, that is to say, at this PUCCH resource time, no other uplink information needs to be sent on the PUCCH resource, except a beam failure request needs to be sent. Further, if two or more PUCCH-BFR resources have other uplink information that needs to be sent, that is, other uplink information needs to be sent on the PUCCH resource within the time of the PUCCH resource where the PUCCH-BFR is located, then in embodiments of the present disclosure, the PUCCH-BFR resource that can be multiplexed with other uplink information can also be preferentially used, so as to ensure that BFR and other uplink information can be sent, and try not to discard any other uplink information, that is, a PUCCH resource that can accommodate other uplink information in addition to beam failure information on the PUCCH-BFR is selected, for example, the PUCCH resource can support more bits. If some other uplink information must be discarded, the other uplink information may be discarded in order according to the priorities of CSI-RS, SRS, HARQ, and SR from high to low.

In embodiments of the present disclosure, when the beam failure occurs and the PUCCH-BFR resource is configured, the PUCCH-BFR resource configured for the serving cell in another serving cell group different from the serving cell group to which the first SCell belongs may be selected. In other words, when a beam failure occurs in an SCell in a PUCCH group, and the SCell in which the beam failure occurs is an SCell configured with PUCCH-BFR, a PUCCH-BFR in another PUCCH group is selected to transmit BFR. For example, in the above example, when beam failure occurs in SCell#3, BFR is sent using PUCCH-BFR1.

In the foregoing embodiments of the present disclosure, the terminal can select one PUCCH-BFR resource from a plurality of PUCCH-BFR resources to send BFR. After the terminal uses the selected PUCCH-BFR resource to send BFR to the network device, it can request the PUSCH resource, and then send MAC CE signaling on the requested PUSCH resource to indicate whether beam failure occurs in the SCell in the PUCCH group configured for the terminal.

Figure 3:
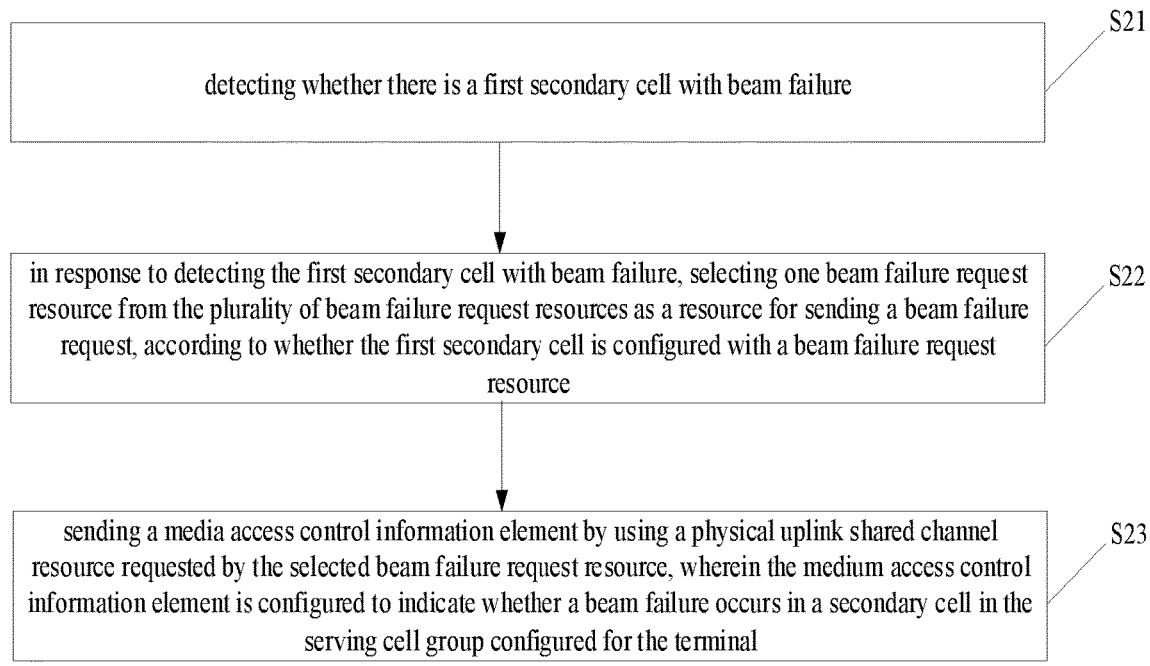
FIG. 3 is a flowchart of a method for allocating beam failure request resources according to an exemplary embodiment.

FIG. 3 is a flowchart of a method for allocating PUCCH-BFR resources according to an exemplary embodiment. As shown in FIG. 2, the method for allocating PUCCH-BFR resources is applied in a terminal, and includes step S21, step S22 and step S23.

Step S21 and step S22 are the same as step S11 and step S12, and are not repeated here.

In step S23, a MAC CE is sent using the PUSCH resource requested by the selected PUCCH-BFR resource, and the MAC CE is configured to indicate whether a beam failure occurs in the SCell in the PUCCH group configured for the terminal.

In embodiments of the present disclosure, according to whether the PUCCH-BFR resource selected by the terminal is the PUCCH-BFR resource configured on the second SCell, the MAC CE can indicate whether the beam failure occurs in all or part of the SCells in the serving cell group configured for the terminal.

In embodiments of the present disclosure, when the PUCCH-BFR resource selected by the terminal is the PUCCH-BFR resource on the second SCell, it may be understood that the PUCCH-BFR resource on the SCell is used to report whether a beam failure occurs on the SCell. After receiving the BFR sent by using the PUCCH-BFR resource on the second SCell, the network device can determine that the SCell in which the beam failure occurs is an SCell belonging to the same PUCCH group as the second SCell. Therefore, at this time, the MAC CE can be used to indicate whether beam failure occurs in other SCells except the second SCell in the PUCCH group to which the SCell belongs, and it is not necessary to indicate whether beam failure occurs in SCells in other PUCCH groups, so that the signaling overhead of MAC CE can be reduced. Further, if a new beam is detected in the SCell in which the beam failure occurs, the index of the new beam may be indicated through the MAC CE.

For example, in the above example, in addition to SCell#3, there is only SCell#4 in PUCCH group 2, so it is only necessary to indicate the index of SCell#4 and new beam index. It can be understood that, since there is only one SCell in PUCCH group 2 except SCell#3, it is actually not necessary to indicate the serving cell index, but only the new beam index needs to be indicated. However, assuming that PUCCH group 2 includes SCell#3, SCell#4 and SCell#5, and SCell#3 is configured with PUCCH-BFR2, then the MAC CE needs to indicate whether beam failure occurs for SCell#4 and SCell#5 respectively. Then if beam failure occurs, the corresponding new beam index is indicated. For example, SCell#4 and SCell#5 each use 1 bit to indicate whether beam failure has occurred. The bit displays '1' to indicate that beam failure has occurred, and '0' to indicate that beam failure has not occurred. The meaning of '0' and '1' may also be changed. For the correspondence between the 2 bits and SCell#4 and SCell#5, the high bit may correspond to the small cell index, namely SCell#4, and the low bit may correspond to the large cell index, namely SCell#5. Of course, it is also possible that the high bit corresponds to the large cell index, namely SCell#5, and the low bit corresponds to the small cell index, namely SCell#4.

In embodiments of the present disclosure, when the PUCCH-BFR resource selected by the terminal is the PUCCH-BFR resource of the PCell/PSCell, for example, when the beam failure occurs in the SCell configured with the PUCCH-BFR, the terminal selects the PUCCH-BFR of the PCell/PSCell to send BFR. When beam failure occurs in an SCell in the same PUCCH group as the PCell/PSCell, the terminal also chooses to send BFR on the PUCCH-BFR of the PCell/PSCell. Therefore, when the network device receives the PUCCH-BFR of the PCell/PSCell, it does not know whether the SCell in which the beam failure occurs is in the PUCCH group1 or in the PUCCH group2. Therefore, when the MAC CE indicates the index of the SCell in which beam failure has occurred, it needs to indicate whether each SCell in all PUCCH groups configured for the terminal has beam failure. That is, the terminal needs to indicate in the MAC CE sent on the PUSCH resource requested by the PUCCH-BFR resource of the PCell/PSCell whether beam failure has occurred in each SCell in all SCells, and for the SCell in which the beam failure has occurred, also indicates the new beam index if the new beam is detected.

For example, in the above example, PUCCH-BFR1 not only needs to be used to indicate beam failure of SCell#3, but may also be used to indicate beam failure of SCell#4 or SCell#5. That is, what the PUCCH-BFR1 indicates may be that a beam failure occurs in an SCell in PUCCH group1, or a beam failure occurs in an SCell in PUCCH group2. Therefore, in addition to PCell/PSCell, the MAC CE for PUCCH-BFR1 needs to indicate whether beam failure occurs in each SCell in all SCells and the corresponding new beam index (if beam failure occurs and a new beam is detected). Similarly, for the above example, for example, the terminal is configured with PCell/PSCell, SCell#1, SCell#2, SCell#3 and SCell#4, then in the MAC CE, for SCell#1, SCell#2, SCell#3 and SCell#4, each SCell has 1 bit to indicate whether beam failure occurs in the SCell. The bit displays '1' to indicate that beam failure has occurred, and '0' to indicate that no beam failure has occurred. Similarly, the meanings of '0' and '1' can be interchanged. For the correspondence between 4 bits and SCell#1, SCell#2, SCell#3 and SCell#4, it may be that the highest bit corresponds to the smallest cell index, namely SCell#1, and the lowest bit corresponds to the largest cell index, namely SCell#4. Of course, it may also be that the highest bit corresponds to SCell#4 with the largest cell index, and the lowest bit corresponds to SCell#1 with the smallest cell index. If beam failure occurs and a new beam is detected, the new beam index on the SCell needs to be indicated accordingly.

The method for allocating PUCCH-BFR resources provided by the above embodiments of the present disclosure implements determining the PUCCH-BFR resource for the terminal to send BFR from multiple PUCCH-BFR resources. And when the terminal is configured with multiple PUCCH-BFRs, the method of selecting the PUCCH-BFR when the SCell beam failure occurs may be as follows. The corresponding PUCCH-BFR is used mainly based on the PUCCH group. Only when the SCell configured with the PUCCH-BFR in the PUCCH group also has beam failure, the PUCCH-BFR configured on the PCell/PSCell is used; otherwise, the PUCCH-BFR in the PUCCH group is used, thereby reducing the signaling overhead of the MAC CE in step 2.

Based on the same concept, embodiments of the present disclosure also provide an apparatus for allocating PUCCH-BFR resources.

It can be understood that, in order to realize the above-mentioned functions, the apparatus for allocating PUCCH-BFR resources provided by embodiments of the present disclosure includes corresponding hardware structures and/or software modules for executing each function. Combining with the units and algorithm steps of each example disclosed in the embodiments of the present disclosure, the embodiments of the present disclosure can be implemented in hardware or a combination of hardware and computer software. Whether a function is performed by hardware or computer software driving hardware depends on the specific application and design constraints of the technical solution. Those skilled in the art may use different methods to implement the described functions for each specific application, but such implementation should not be considered beyond the scope of the technical solutions of the embodiments of the present disclosure.

Figure 4:
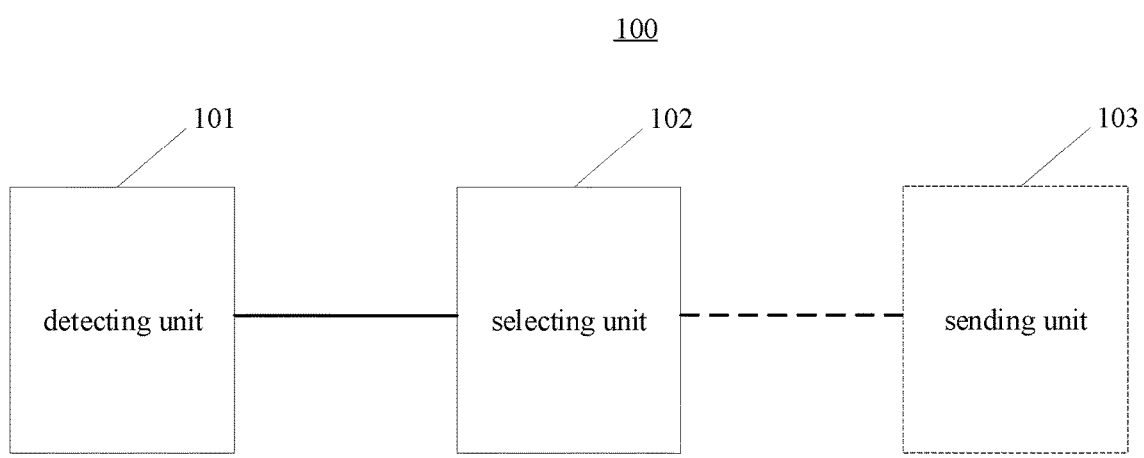
FIG. 4 is a block diagram of an apparatus for allocating beam failure request resources according to an exemplary embodiment.

FIG. 4 is a block diagram of an apparatus for allocating PUCCH-BFR resources according to an exemplary embodiment. Referring to FIG. 4, the apparatus 100 for allocating PUCCH-BRF resources includes a detecting unit 101 and a selecting unit 102.

The detecting unit 101 is configured to detect whether there is a first SCell with beam failure. The selecting unit 102 is configured to select one PUCCH-BFR resource from a plurality of PUCCH-BFR resources according to whether the first SCell is configured with a PUCCH-BFR resource when the detecting unit detects the first SCell with beam failure, as the resource for sending the beam failure request.

In an implementation, when the first SCell is not configured with a PUCCH-BFR resource, the selecting unit 102 selects one PUCCH-BFR resource from the plurality of PUCCH-BFR resources in at least one of the following ways:

selecting the PUCCH-BFR resource configured for the serving cell in the serving cell group to which the first SCell belongs; selecting the PUCCH-BFR resource that occurs first in time; selecting the PUCCH-BFR resource that does not need to transmit other uplink information; selecting the PUCCH-BFR resource that can be multiplexed with other uplink information.

In another implementation, when the first SCell is configured with the PUCCH-BFR resource, the selecting unit 102 selects the PUCCH-BFR resource configured for the serving cell in another serving cell group different from the serving cell group to which the first SCell belongs.

In yet another implementation, the apparatus 100 for allocating PUCCH-BFR resources further includes a sending unit 103.

The sending unit 103 is configured to send the BFR using the selected PUCCH-BFR resource to request the PUSCH resource.

The sending unit 103 is further configured to send a medium access control information element by using the physical uplink shared channel resource requested by the selected PUCCH-BFR resource, wherein the medium access control information element is configured to indicate whether a beam failure occurs in each SCell in the serving cell groups configured for the terminal.

In another implementation, the selected PUCCH-BFR resource is the PUCCH-BFR resource configured on the primary cell or the primary SCell. The medium access control information element is configured to indicate whether beam failure occurs in each SCell in all serving cell groups configured for the terminal.

In another implementation, the selected PUCCH-BFR resource is the PUCCH-BFR resource configured on the second SCell. The medium access control information element is configured to indicate whether beam failure occurs in other SCells except the second SCell in the serving cell group to which the second SCell belongs.

In another implementation, if it is determined that a new beam exists in the first SCell, the medium access control information element is further configured to indicate the new beam.

Regarding the apparatus in the above-mentioned embodiment, the specific manner in which each module performs operations has been described in detail in the embodiments of the method, and will not be described in detail here.

Figure 5:
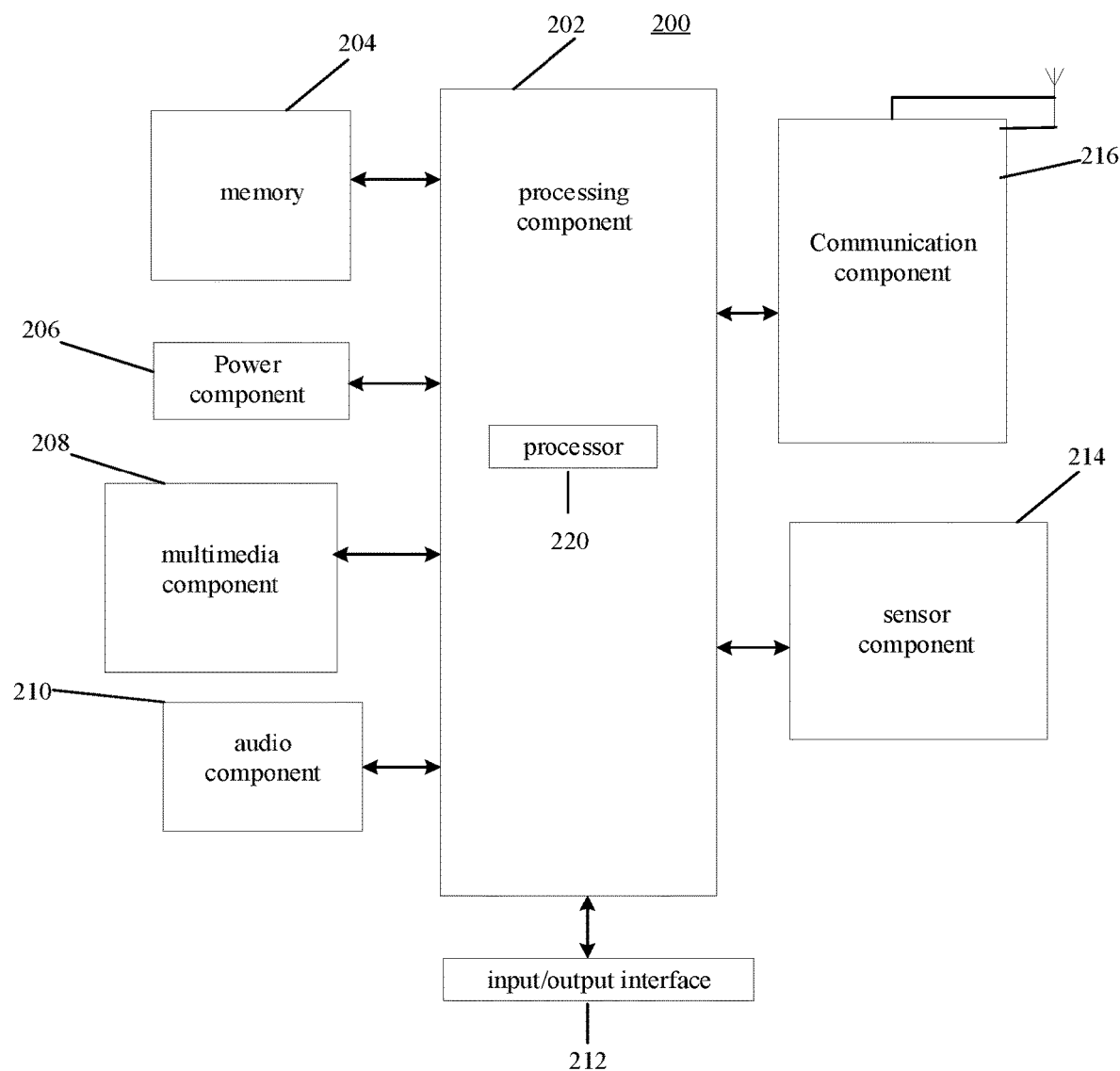
FIG. 5 is a block diagram of a device according to an exemplary embodiment.

FIG. 5 is a block diagram of an apparatus 200 for allocating PUCCH-BFR resources according to an exemplary embodiment. For example, the apparatus 200 may be a mobile phone, a computer, a digital broadcasting terminal, a message transceiver device, a game console, a tablet device, a medical device, a fitness device and a personal digital assistant.

Referring to FIG. 5, the apparatus 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200, such as the operations associated with display, telephone calls, data communications, camera operations, and recording operations. The processing component 202 may include one or more processors 220 to execute instructions to perform all or part of the steps in the above described method. Moreover, the processing component 202 may include one or more modules which facilitate the interaction between the processing component 202 and other components. For instance, the processing component 202 may include a multimedia module to facilitate the interaction between the multimedia component 3008 and the processing component 202.

The memory 204 is configured to store various types of data to support the operation of the apparatus 200. Examples of such data include instructions for any applications or methods operated on the apparatus 200, contact data, phonebook data, messages, pictures, video, etc. The memory 204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200. The power component 206 may include a power management system, one or more power sources, and any other components associated with the generation, management, and distribution of power in the apparatus 200.

The multimedia component 208 includes a screen providing an output interface between the apparatus 200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 208 includes a front-facing camera and/or a rear-facing camera. When the apparatus 200 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 210 is configured to output and/or input audio signals. For example, the audio component 210 includes a microphone (MIC) configured to receive an external audio signal when the apparatus 200 is in an operation mode, such as a call mode, a recording mode, and a voice recognition mode. The received audio signal may be further stored in the memory 3004 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons may include, but are not limited to, a home button, a volume button, a starting button, and a locking button.

The sensor component 214 includes one or more sensors to provide status assessments of various aspects of the apparatus 200. For instance, the sensor component 214 may detect an open/closed status of the apparatus 200, relative positioning of components, e.g., the display and the keypad, of the apparatus 2000, a change in position of the apparatus 200 or a component of the apparatus 200, a presence or absence of user contact with the apparatus 200, an orientation or an acceleration/deceleration of the apparatus 200, and a change in temperature of the apparatus 200. The sensor component 214 may include a proximity sensor configured to detect the presence of nearby objects without any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication, wired or wirelessly, between the apparatus 200 and other devices. The apparatus 200 can access a wireless network based on a communication standard, such as WiFi, 2G, or 3G, or a combination thereof. In an exemplary embodiment, the communication component 216 receives a broadcast signal or broadcast associated information from an external broadcast management system via a broadcast channel. In an exemplary embodiment, the communication component 216 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 204, executable by the processor 220 in the apparatus 200, for performing the above method. For example, non-transitory computer-readable storage medium may be a ROM, a RAM, a CD-ROM, a magnetic tape, a floppy disc, an optical data storage device, and the like.

It should be further understood that in the present disclosure, "plurality" refers to two or more, and other quantifiers are similar. "And/or", which describes the association relationship of the associated objects, means that there can be three kinds of relationships, for example, A and/or B, which can mean that A exists alone, A and B exist at the same time, and B exists alone. The character "/" generally indicates that the associated objects are in an "or" relationship. The singular forms "a," "the," and "said" are intended to include the plural forms as well, unless the context clearly dictates otherwise.

It is further understood that the terms "first", "second", etc. are used to describe various information, but the information should not be limited to these terms. These terms are only used to distinguish the same type of information from one another, and do not imply a particular order or level of importance. In fact, the expressions "first", "second" etc. are used completely interchangeably. For example, the first information may also be referred to as the second information, and similarly, the second information may also be referred to as the first information, without departing from the scope of the present disclosure.

It is further to be understood that, although the operations in the embodiments of the present disclosure are described in a specific order in the drawings, it should not be construed as requiring that the operations be performed in the specific order shown or in the serial order, or requiring to perform all operations shown to obtain the desired result. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for allocating beam failure request resources, performed by a terminal, wherein the terminal is configured with a plurality of beam failure request resources, and the plurality of beam failure request resources include physical uplink control channel beam failure request resources configured for serving cells in a plurality of service cell groups configured for the terminal, the method comprising:
   detecting whether there is a first secondary cell with beam failure;
   in response to detecting the first secondary cell with beam failure, selecting one beam failure request resource from the plurality of beam failure request resources as a resource for sending a beam failure request, according to whether the first secondary cell is configured with a beam failure request resource;

when the first secondary cell is not configured with the beam failure request resource, selecting the beam failure request resource configured for one serving cell in a serving cell group, of the plurality of service cell groups, to which the first secondary cell belongs; and sending a medium access control information element by using a physical uplink shared channel resource requested by the selected beam failure request resource, wherein the medium access control information element is configured to indicate whether a beam failure occurs in a secondary cell in the serving cell group configured for the terminal;

wherein the plurality of beam failure request resources comprise a beam failure request resource configured for a primary cell or a primary secondary cell, and a beam failure request resource configured for a second secondary cell;

when the selected beam failure request resource is the beam failure request resource configured for the primary cell or the primary secondary cell the medium access control information element is configured to indicate whether beam failure occurs in secondary cells in all serving cell groups configured for the terminal.

2. The method of claim 1, wherein when the first secondary cell is not configured with the beam failure request resource, selecting one beam failure request resource from the plurality of beam failure request resources by at least one of following ways:

selecting a beam failure request resource of the plurality of beam failure request resources that occurs first in time;

selecting a beam failure request resource of the plurality of beam failure request resources that does not need to transmit other uplink information; or selecting a beam failure request resource of the plurality of beam failure request resources that can be multiplexed with other uplink information.

3. The method of claim 1, wherein when the first secondary cell is configured with the one beam failure request resource, the one beam failure request resource configured for a second serving cell of another serving cell group different from a first serving cell group to which the first secondary cell belongs is selected.

4. The method of claim 1, wherein the plurality of beam failure request resources comprise a beam failure request resource configured for a primary cell or a primary secondary cell, and a beam failure request resource configured for a second secondary cell;

when the selected beam failure request resource is the beam failure request resource configured for the second secondary cell the medium access control information element is configured to indicate whether beam failure occurs in other secondary cells other than the second secondary cell in the serving cell group to which the second secondary cell belongs.

5. The method of claim 1, further comprising:

in response to determining that a new beam exists in the first secondary cell, the medium access control information element is further configured to indicate the new beam.

6. A terminal, wherein the terminal is configured with a plurality of beam failure request resources, and the plurality of beam failure request resources include physical uplink control channel beam failure request resources configured for serving cells in a plurality of service cell groups configured for the terminal, the terminal comprising:

a processor;

a memory configured to store instructions executable by the processor, wherein the processor is configured to:

detect whether there is a first secondary cell with beam failure;

in response to detecting the first secondary cell with beam failure, select one beam failure request resource from the plurality of beam failure request resources as a resource for sending a beam failure request, according to whether the first secondary cell is configured with a beam failure request resource;

when the first secondary cell is not configured with the beam failure request resource, selecting the beam failure request resource configured for one serving cell in a serving cell group, of the plurality of service cell groups, to which the first secondary cell belongs; and send a medium access control information element by using a physical uplink shared channel resource requested by the selected beam failure request resource, wherein the medium access control information element is configured to indicate whether a beam failure occurs in a secondary cell in the serving cell group configured for the terminal;

wherein the plurality of beam failure request resources comprise a beam failure request resource configured for a primary cell or a primary secondary cell, and a beam failure request resource configured for a second secondary cell;

when the selected beam failure request resource is the beam failure request resource configured for the primary cell or the primary secondary cell, the medium access control information element is configured to indicate whether beam failure occurs in secondary cells in all serving cell groups configured for the terminal.

7. A non-transitory computer readable storage medium, wherein when instructions in the storage medium is executed by a processor of a mobile terminal, the mobile terminal is enabled to implement a method for allocating beam failure request resources, the method comprising:

detecting whether there is a first secondary cell with beam failure;

in response to detecting the first secondary cell with beam failure, selecting one beam failure request resource from a plurality of beam failure request resources as a resource for sending a beam failure request, according to whether the first secondary cell is configured with a beam failure request resource;

when the first secondary cell is not configured with the beam failure request resource, selecting the beam failure request resource configured for one serving cell in a serving cell group, of a plurality of service cell groups, to which the first secondary cell belongs;

sending a medium access control information element by using a physical uplink shared channel resource requested by the selected beam failure request resource, wherein the medium access control information element is configured to indicate whether a beam failure occurs in a secondary cell in the serving cell group configured for the terminal;

wherein the plurality of beam failure request resources comprise a beam failure request resource configured for a primary cell or a primary secondary cell, and a beam failure request resource configured for a second secondary cell;

when the selected beam failure request resource is the beam failure request resource configured for the primary cell or the primary secondary cell, the medium access control information element is configured to indicate whether beam failure occurs in secondary cells in all serving cell groups configured for the terminal.

8. The terminal of claim 6, wherein when the first secondary cell is not configured with the beam failure request resource, the processor is configured to select one beam failure request resource from the plurality of beam failure request resources by at least one of following ways:
  selecting a beam failure request resource of the plurality of beam failure request resources that occurs first in time;
  selecting a beam failure request resource of the plurality of beam failure request resources that does not need to transmit other uplink information;
  selecting a beam failure request resource of the plurality of beam failure request resources that can be multiplexed with other uplink information.

9. The terminal of claim 6, wherein when the first secondary cell is configured with the beam failure request resource, the processor is configured to select the one beam failure request resource configured for a second serving cell of another serving cell group different from a first serving cell group to which the first secondary cell belongs.

10. The terminal of claim 6, wherein
  the plurality of beam failure request resources comprise a beam failure request resource configured for a primary cell or a primary secondary cell, and a beam failure request resource configured for a second secondary cell;
  when the selected beam failure request resource is the beam failure request resource configured for the second secondary cell,
  the medium access control information element is configured to indicate whether beam failure occurs in other secondary cells other than the second secondary cell in the serving cell group to which the second secondary cell belongs.

11. The terminal of claim 6, wherein
  in response to determining that a new beam exists in the first secondary cell, the medium access control information element is further configured to indicate the new beam.

* * * * *